US012399052B1

(12) United States Patent
Shah et al.

(10) Patent No.: US 12,399,052 B1
(45) Date of Patent: Aug. 26, 2025

(54) FLUID LEVEL MONITORING

(71) Applicant: Auradine, Inc., Santa Clara, CA (US)

(72) Inventors: Darshan Shah, Milpitas, CA (US); Gobinath Krishnamoorthy, Cupertino, CA (US)

(73) Assignee: Auradine, Inc., Santa Clara, CA (US)

( * ) Notice: Subject to any disclaimer, the term of this patent is extended or adjusted under 35 U.S.C. 154(b) by 0 days.

(21) Appl. No.: 19/033,107

(22) Filed: Jan. 21, 2025

(51) Int. Cl.
*G01F 23/263* (2022.01)

(52) U.S. Cl.
CPC ................. *G01F 23/263* (2013.01)

(58) Field of Classification Search
CPC .............. H05K 7/203; H05K 7/20318; H05K 7/20327; H05K 7/20809; H05K 7/20272; H05K 7/20236; G01F 23/0076; G01F 23/263; G01F 23/268; G01N 27/228; G01N 29/2406; G01R 27/26
USPC .... 73/304 C, 514.32, 718, 724, 335.04, 780, 73/862.337, 862.626
See application file for complete search history.

(56) References Cited

U.S. PATENT DOCUMENTS

| | | |
|---|---|---|
| 2011/0317367 A1 | 12/2011 | Campbell et al. |
| 2013/0091866 A1 | 4/2013 | Campbell et al. |
| 2016/0003663 A1* | 1/2016 | Miatton ............... G01F 23/266 73/304 C |
| 2017/0135530 A1* | 5/2017 | Macleod ............... G01F 23/263 |
| 2017/0290198 A1 | 10/2017 | Shepard et al. |
| 2018/0279507 A1 | 9/2018 | Midgley et al. |
| 2020/0093037 A1 | 3/2020 | Enright et al. |
| 2020/0323108 A1 | 10/2020 | Bilan et al. |
| 2021/0018356 A1* | 1/2021 | Bean, Jr. ............ H05K 7/20809 |
| 2022/0418156 A1* | 12/2022 | Cushen .............. H05K 7/20236 |
| 2023/0156959 A1* | 5/2023 | Malouin ............ H05K 7/20781 361/699 |

FOREIGN PATENT DOCUMENTS

| | | | | |
|---|---|---|---|---|
| CN | 110231070 A | * | 9/2019 | ............. A24F 40/42 |
| CN | 110347637 A | * | 10/2019 | |
| CN | 118119165 A | * | 5/2024 | |

* cited by examiner

*Primary Examiner* — John E Breene
*Assistant Examiner* — Truong D Phan
(74) *Attorney, Agent, or Firm* — Fish & Richardson P.C.

(57) ABSTRACT

Some aspects of the present disclosure involve an apparatus including: a sensor mounted on an electronic device submerged in a cooling fluid in an immersion tank. The sensor includes circuitry configured to: measure a value of a capacitance of the cooling fluid; and transmit the measured value of the capacitance to a controller device that is communicatively coupled to the at least one sensor. The controller device including one or more processors and configured to: receive the measured value of the capacitance from the at least one sensor; determine that the measured value of the capacitance is less than a threshold value; determine that a fluid level of the cooling fluid in the immersion tank is below a threshold level; and perform a remedial action in response to determining that the fluid level of the cooling fluid in the immersion tank is below the threshold level.

18 Claims, 7 Drawing Sheets

FLUID LEVEL MONITORING

TECHNICAL FIELD

The present disclosure generally relates to devices, systems, and methods to monitor a fluid level of an immersion cooling fluid in an immersion cooling tank.

BACKGROUND

Immersion cooling fluid is a specialized dielectric substance used in an immersion cooling tank to submerge electronic components, such as high-performance integrated circuit chips, servers, and data center equipment, for efficient heat dissipation. A low fluid level of the immersion cooling fluid in an immersion cooling tank can lead to equipment overheating, corrosion, or even complete system failure.

SUMMARY

One aspect of the present disclosure relates to an apparatus including: at least one sensor mounted on an electronic device submerged in a cooling fluid in an immersion tank, wherein the at least one sensor includes circuitry configured to: measure a value of a capacitance of the cooling fluid; and transmit the measured value of the capacitance to a controller device that is communicatively coupled to the at least one sensor; and the controller device including one or more processors and configured to: receive the measured value of the capacitance from the at least one sensor; determine that the measured value of the capacitance is less than a threshold value; in response to determining that the measured value of the capacitance is less than the threshold value, determine that a fluid level of the cooling fluid in the immersion tank is below a threshold level; and perform at least one remedial action in response to determining that the fluid level of the cooling fluid in the immersion tank is below the threshold level.

In some implementations, wherein the threshold value is a first threshold value of a plurality of threshold values, and wherein performing the remedial action includes transmitting, to a system operator, a notification of the fluid level in the immersion tank.

In some implementations, wherein the threshold value is a second threshold value of the plurality of threshold values, the second threshold value corresponding to a fluid level in the immersion tank being lower than a fluid level corresponding to the first threshold value, and wherein performing the remedial action includes transmitting a first signal that causes the electronic device submerged in the cooling fluid in the immersion tank to enter a low power state.

In some implementations, wherein the threshold value is a third threshold value of the plurality of threshold values, the third threshold value corresponding to a fluid level in the immersion tank being lower than a fluid level corresponding to the second threshold value, and wherein performing the remedial action includes transmitting a second signal that causes the electronic devices submerged in the cooling fluid in the immersion tank to shut down.

In some implementations, wherein the cooling fluid includes a single-phase immersion cooling liquid or a two-phase immersion cooling liquid.

In some implementations, wherein the at least one sensor includes: a capacitive sensor; and a capacitance-to-digital converter.

In some implementations, the apparatus further including: a heat exchanger configured to dissipate heat generated by the electronic device using the cooling fluid; and a pump system configured to circulate the cooling fluid through the immersion tank and the heat exchanger.

In some implementations, wherein the electronic device includes a printed circuit board (PCB) with a plurality of application-specific integrated circuit (ASIC) chips mounted thereon, and wherein the at least one sensor is mounted on the PCB adjacent to the plurality of ASIC chips.

In some implementations, the at least one sensor includes a plurality of sensors mounted on the PCB, wherein the plurality of ASIC chips are arranged in a plurality of blocks on the PCB, each block including a plurality of columns and each column including a subset of the plurality of ASIC chips, and wherein a different sensor of the plurality of sensors is mounted adjacent to each block.

In some implementations, wherein the electronic device includes a plurality of PCBs submerged in the cooling fluid in the immersion tank, each PCB including: a plurality of ASIC chips and a plurality of sensors, wherein the respective plurality of ASIC chips are arranged in a plurality of blocks on the PCB, each block including a plurality of columns and each column including a subset of the plurality of ASIC chips, and wherein a different sensor of the respective plurality of sensors is mounted adjacent to each block.

Another aspect of the present disclosure relates to a method including: receiving a first measurement of a value of a capacitance of a cooling fluid from one or more sensors mounted on one or more electronic devices submerged in the cooling fluid of an immersion tank; determining, based at least on the first measurement, that the measured value of the capacitance is less than a first threshold value of a plurality of threshold values; and in response to determining that the measured value of the capacitance is less than the first threshold value, determining that a fluid level of the cooling fluid in the immersion tank is below a first threshold level corresponding to the first threshold value; transmitting, to a system operator, a notification of the fluid level in the immersion tank in response to determining that the fluid level of the cooling fluid in the immersion tank is below the first threshold level.

In some implementations, the method further including: receiving a second measurement of the value of the capacitance of the cooling fluid from the one or more sensors; determining, based at least on the second measurement, that the measured value of the capacitance is less than a second threshold value of the plurality of threshold values, wherein the second threshold value corresponds to a second threshold level in the immersion tank being lower than the first threshold level corresponding to the first threshold value; and in response to the determining, transmitting a first signal that causes at least one of the one or more electronic devices submerged in the cooling fluid in the immersion tank to enter a low power state.

In some implementations, the method further including: receiving a third measurement of the value of the capacitance of the cooling fluid from the one or more sensors; determining, based at least on the third measurement, that the measured value of the capacitance is less than a third threshold value of the plurality of threshold values, wherein the third threshold value corresponds to a third threshold level in the immersion tank being lower than the second threshold level corresponding to the second threshold value; and in response to the determining, transmitting a second signal that causes at least one of the one or more electronic devices submerged in the cooling fluid in the immersion tank to shut down.

In some implementations, wherein the cooling fluid includes a single-phase immersion cooling liquid or a two-phase immersion cooling liquid.

In some implementations, wherein each electronic device includes a printed circuit board (PCB) with a plurality of application-specific integrated circuit (ASIC) chips mounted thereon, and wherein the one or more sensors are mounted on the PCB adjacent to the plurality of ASIC chips.

In some implementations, the one or more sensors include a plurality of sensors mounted on the PCB, wherein the plurality of ASIC chips are arranged in a plurality of blocks on the PCB, each block including a plurality of columns and each column including a subset of the plurality of ASIC chips, and wherein a different sensor of the plurality of sensors is mounted adjacent to each block.

In some implementations, wherein each electronic device includes a plurality of PCBs submerged in the cooling fluid in the immersion tank, each PCB including: a plurality of ASIC chips and a plurality of sensors, wherein the respective plurality of ASIC chips are arranged in a plurality of blocks on the PCB, each block including a plurality of columns and each column including a subset of the plurality of ASIC chips, and wherein a different sensor of the respective plurality of sensors is mounted adjacent to each block.

Another aspect of the present disclosure relates to one or more non-transitory computer-readable media storing instructions that, when executed, cause one or more processors to perform operations including: receiving a first measurement of a value of a capacitance of a cooling fluid from one or more sensors mounted on one or more electronic devices submerged in the cooling fluid of an immersion tank; determining, based at least on the first measurement, that the measured value of the capacitance is less than a first threshold value of a plurality of threshold values; and in response to determining that the measured value of the capacitance is less than the first threshold value, determining that a fluid level of the cooling fluid in the immersion tank is below a first threshold level; transmitting, to a system operator, a notification of the fluid level in the immersion tank in response to determining that the fluid level of the cooling fluid in the immersion tank is below the first threshold level.

In some implementations, the operations further including: receiving a second measurement of the value of the capacitance of the cooling fluid from the one or more sensors; determining, based at least on the second measurement, that the measured value of the capacitance is less than a second threshold value of the plurality of threshold values, wherein the second threshold value corresponds to a second threshold level in the immersion tank being lower than the first threshold level corresponding to the first threshold value; and in response to the determining, transmitting a first signal that causes at least one of the one or more electronic devices submerged in the cooling fluid in the immersion tank to enter a low power state.

In some implementations, the operations further including: receiving a third measurement of the value of the capacitance of the cooling fluid from the one or more sensors; determining, based at least on the third measurement, that the measured value of the capacitance is less than a third threshold value of the plurality of threshold values, wherein the third threshold value corresponds to a third threshold level in the immersion tank being lower than the second threshold level corresponding to the second threshold value; and in response to the determining, transmitting a second signal that causes at least one of the one or more electronic devices submerged in the cooling fluid in the immersion tank to shut down.

Another aspect of the present disclosure relates to an apparatus that includes one or more processors and memory storing instructions that, when executed, cause the apparatus to perform any of the foregoing operations.

Another aspect of the present disclosure relates to a non-transitory computer-readable medium storing instructions that, when executed, cause one or more processors to perform any of the foregoing operations.

DETAILED DESCRIPTION

Figure 1A:
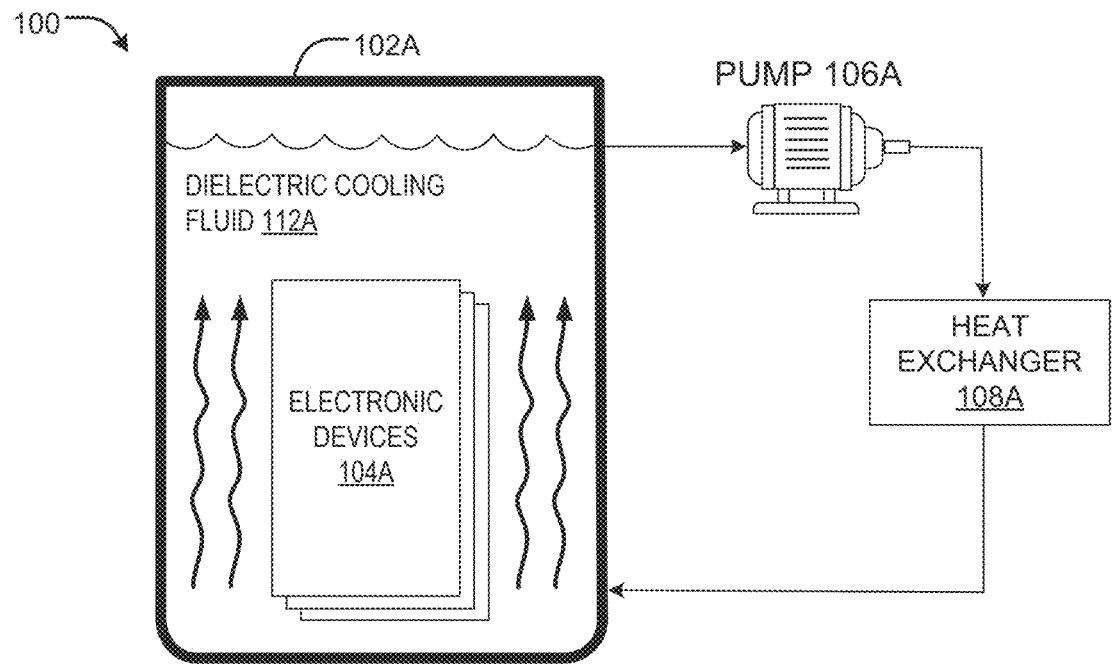
FIG. 1A is a schematic diagram of an example single-phase immersion cooling system, according to some implementations.

An immersion cooling tank is a type of cooling apparatus that holds a thermally conductive but electrically non-conductive cooling fluid in which high-performance electronic devices, such as integrated circuit (IC) chips for hash computations, servers, or computer processors, are submerged directly. Immersion cooling is used to efficiently remove heat from high-performance electronic devices, which allows for higher energy efficiency, reduced noise, and improved performance due to lower operating temperatures, e.g., performing high-rate operations without thermal breakdown. In some cases, the cooling fluid is a specialized dielectric substance (e.g., a single-phase or two-phase dielectric liquid) used in the immersion cooling tank to submerge electronic devices for efficient heat dissipation. By fully immersing these devices in the cooling fluid, heat is directly transferred from the electronics to the fluid, which is then circulated to remove the heat, providing more effective cooling (in comparison to conventional air-based cooling methods). In some cases, however, the fluid level of the immersion cooling fluid may be low, e.g., due to a leak of the immersion cooling tank or fluid evaporation, which can potentially lead to equipment overheating, corrosion, or system failure due to thermal breakdown.

In accordance with aspects of the present disclosure, an immersion cooling system includes one or more fluid level sensors that are present in an immersion cooling tank. A fluid level sensor is configured to monitor a fluid level of cooling fluid in the immersion cooling tank. The immersion cooling system further includes a controller that is configured to perform one or more remedial actions if the fluid level of cooling fluid is detected to be below a predetermined threshold level based on measurements by the one or more sensors. In some implementations, each fluid level sensor includes a capacitive sensor and a capacitance-to-digital converter, and is mounted on an electronic device. For example, as described in the following sections, one such electronic device can be a printed circuit boards (PCB), with a plurality of IC chips configured to perform hash computations (e.g., for cryptocurrency tasks). One or more such PCBs can be immersed in the cooling fluid in an immersion cooling tank. Each PCB can have one or more fluid level sensors to monitor the level of fluid in which the PCB is immersed in the tank. The measurements by the fluid level sensors are transmitted to the controller. The controller may include a control board with one or more processors and memory storing instructions that are executed by the processors to perform remedial actions (e.g., shutting off power to the electronic devices immersed in the tank) if a low fluid level is detected based on the measurements by the fluid level sensors. In some implementations, the controller is configured to, or otherwise capable of communicating, with the electronic devices in the tank via wired communication like a docking procedure, or a wireless communication protocol like Bluetooth or Wi-Fi.

FIG. 1A is a schematic diagram of an example single-phase immersion cooling system 100, according to some implementations. The single-phase immersion cooling system 100 includes a container or tank 102A that holds a volume of dielectric cooling fluid 112A. Electronic devices 104A (e.g., servers, processors, PCBs with IC chips performing high-performance computations such as hash operations for cryptocurrency mining, or other heat-generating electronic components) are immersed in the dielectric cooling fluid 112A. In some implementations, the dielectric cooling fluid 112A is an electrically non-conductive liquid, ensuring the safe operation of the electronic devices 104A while maintaining thermal conductivity to absorb the heat produced by the electronic devices 104A during operation.

A pump 106A is configured to circulate the dielectric cooling fluid 112A throughout the tank 102A, ensuring a consistent flow of the dielectric cooling fluid around the electronic devices 104A. Circulating the dielectric cooling fluid 112A through tank 102A facilitates the absorption and distribution of heat away from the heat-generating electronic devices 104A. The dielectric cooling fluid 112A remains in a liquid state (single-phase) during the entire cooling process, avoiding any phase change to gas or vapor.

The single-phase immersion cooling system 100 is further equipped with a heat exchanger 108A that is thermally connected to the dielectric cooling fluid 112A. The heat exchanger 108A is responsible for transferring heat absorbed by the dielectric cooling fluid 112A from the electronic devices 104A to an external cooling medium, such as air or water. As the pump 106A drives the dielectric cooling fluid 112A through the heat exchanger 108A, heat is dissipated from the dielectric cooling fluid 112A to the external cooling medium, which cools the dielectric cooling fluid 112A before it is recirculated back to the tank.

During operation, the electronic devices 104A generate heat, which is transferred directly to the surrounding dielectric cooling fluid 112A. The dielectric cooling fluid 112A has a high thermal conductivity, allowing the cooling fluid 112A to efficiently absorb heat and prevent the electronic devices 104A from overheating. The pump 106A circulates the cooling fluid 112A such that hotter fluid 112A is continuously replaced with colder fluid 112A.

As the cooling fluid 112A is circulated, it passes through the heat exchanger 108A, where excess heat is transferred from the cooling fluid 112A to the external cooling medium. The cooled fluid 112A then flows back into the tank 102A to continue the cooling cycle. This process aims to maintain a stable operating temperature for the electronic devices 104A.

Figure 1B:
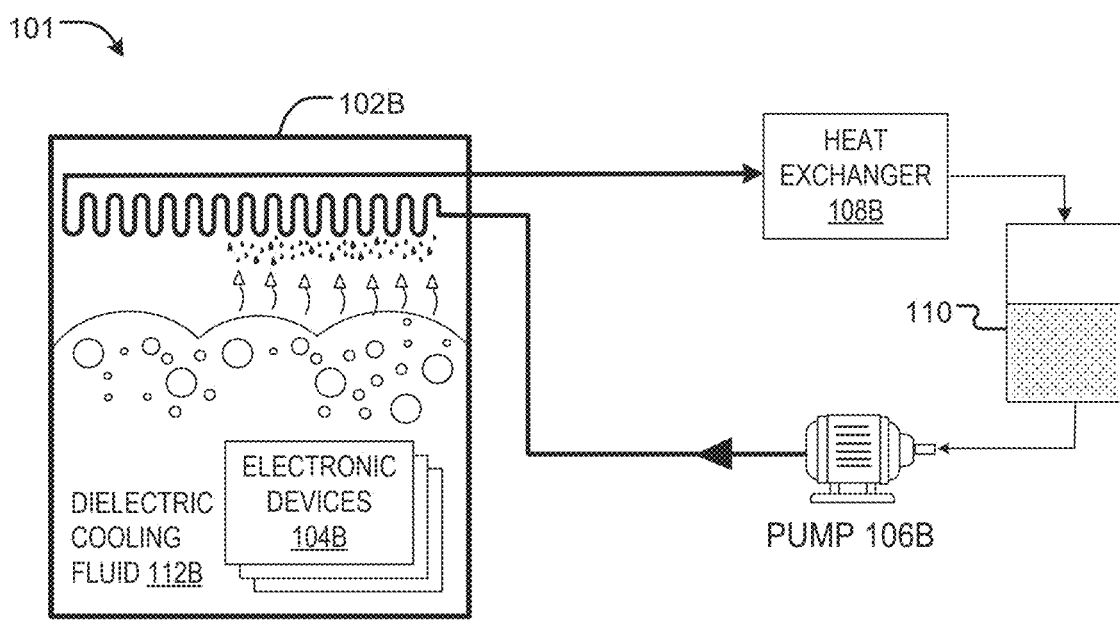
FIG. 1B is a schematic diagram of an example dual-phase immersion cooling system, according to some implementations.

FIG. 1B is a schematic diagram of an example dual-phase immersion cooling system 101, according to some implementations. The dual-phase immersion cooling system 101 includes tank 102B, which holds a volume of dielectric cooling fluid 112A. Electronic devices 104B, such as servers, processors, PCBs with IC chips performing high-performance computations (e.g., hash operations for cryptocurrency mining), or other heat-generating components, are immersed in the dielectric cooling fluid 112A. The dielectric cooling fluid 112A is electrically non-conductive, which ensures the safe operation of the electronic devices 104B while allowing effective thermal conductivity for heat absorption.

Unlike the single-phase immersion cooling system 100, the dielectric cooling fluid 112B of the dual-phase immersion cooling system 101 undergoes a phase change from liquid to gas/vapor as it absorbs heat from the electronic devices 104B. This phase change allows the dual-phase immersion cooling system 101 to manage high thermal loads more efficiently, as compared to the single-phase immersion cooling system 100.

The dual-phase immersion cooling system 101 includes a pump 106B that is configured to circulate the dielectric cooling fluid 112B, ensuring even distribution of the fluid and vapor throughout the tank. The dual-phase immersion cooling system 101 also includes a heat exchanger 108B, which is configured to remove heat from the cooling fluid 112B as part of the cooling cycle. Additionally, the dual-phase immersion cooling system 101 includes a condensation unit 110, where gases/vapors are converted back to liquid by means of coils or other cooling mechanisms.

During operation, the electronic devices 104B generate heat, which is absorbed by the surrounding dielectric cooling fluid 112B. As the cooling fluid 112B absorbs heat, the cooling fluid 112B vaporizes, transitioning from a liquid phase to a gas/vapor phase. This gas/vapor rises within the tank 102B and passes through the heat exchanger 108B before reaching the condensation unit 110, where the vapor is converted back to a liquid. The cooled, recondensed dielectric cooling fluid 112B is then returned to tank 102B via pump 106B.

The single-phase immersion cooling system 100 and/or the dual-phase immersion cooling system 101 can provide improved thermal management and reduced energy consumption (e.g., by eliminating the need for traditional air-cooling methods), among other benefits. The use of dielectric cooling fluid prevents electrical interference, and the continuous circulation of dielectric cooling fluid helps to ensure a consistent and efficient dissipation of heat.

Immersion cooling systems (both single and dual phase) for high performance computations rely on a consistent volume of immersion cooling fluid. Over time, the fluid level of the immersion cooling fluid in the tank may reduce to a low level (e.g., in the case of a leak in the tank or high evaporation in the cooling tank), which can cause one or more electronic devices 104A or 104B to lose the submersion in the cooling fluid, which may lead to overheating of the electronic devices 104A or 104B and consequent thermal failure.

In accordance with aspects of the present disclosure, the single-phase immersion cooling system 100 and/or the dual-phase immersion cooling system 101 may be equipped with one or more fluid level sensors mounted on the electronic devices 104A or 104B and configured to monitor a fluid level of the dielectric cooling fluid, and a controller configured to take remedial actions if the fluid level is detected to be lower than a predetermined threshold. The remedial actions can include transmitting an alert to a system operator, powering down (e.g., entering a low power state) the electronic devices, or shutting down the electronic devices.

Figure 2:
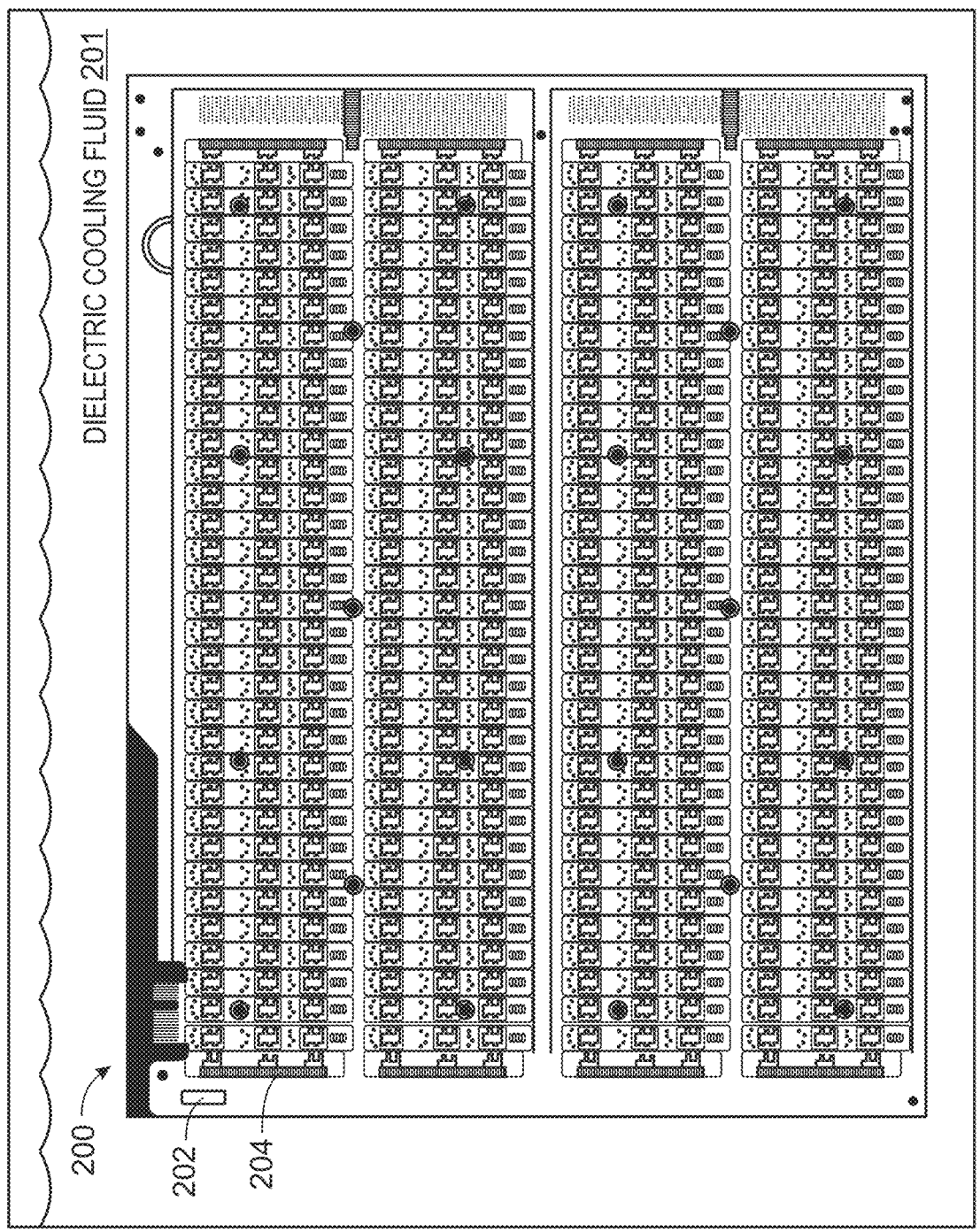
FIG. 2 is a schematic diagram of an example electronic device immersed in dielectric cooling fluid, according to some implementations.

FIG. 2 is a schematic diagram of an example electronic device 200 immersed in dielectric cooling fluid 201 in a tank, according to some implementations. As shown in FIG. 2, the electronic device 200 includes a printed circuit board (PCB) that includes a plurality of application-specific integrated circuit (ASIC) chips 204 mounted on the PCB. In some implementations, the size of the PCB is 12.6 inches× 9.8 inches, although other dimensions are also possible. A fluid level sensor 202 is mounted on the PCB adjacent to the plurality of ASIC chips. The fluid level sensor 202 is on the top side of the PCB when the PCB is immersed in the dielectric cooling fluid 201. In some implementations, the electronic device 200 is an example of electronic device 104A or 104B described above.

A plurality of the ASIC chips 204 are configured for high-performance computations (e.g., high data-rate computations). For example, one or more ASIC chips 204 can be configured to compute the specific hash algorithm of a cryptocurrency (e.g., SHA-256 for Bitcoin, Ethash for Ethereum, among others). The plurality of ASIC chips are integrated to perform these computations jointly or in parallel to increase computational power (e.g., hash rate).

Figure 3:
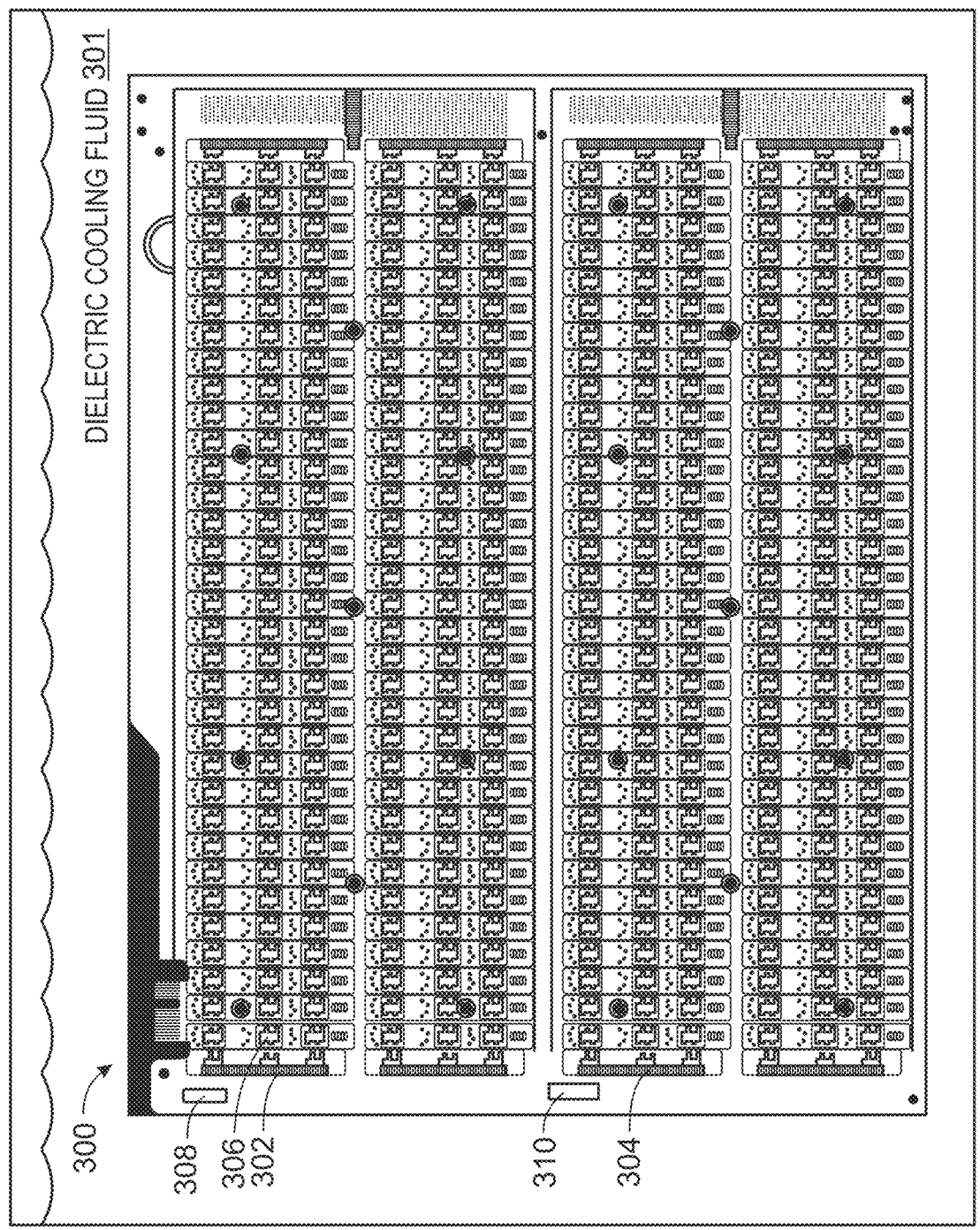
FIG. 3 is a schematic diagram of an example electronic device immersed in dielectric cooling fluid, according to some implementations.

Although FIG. 2 shows a single sensor 202 mounted on the PCB of the electronic device 200, other implementations can have electronic devices with a plurality of sensors. For example, FIG. 3 is a schematic diagram of an example electronic device 300 immersed in dielectric cooling fluid 301 in a tank, according to some implementations. In some implementations, the electronic device 300 is an example of electronic device 104A or 104B described above. The electronic device 300 includes a PCB that includes a plurality of blocks, e.g., blocks 302 and 304. Each block includes a plurality of ASIC chips 306 mounted on the PCB. Each ASIC chip is configured for high-performance computations (e.g., high data-rate computations). For example, one or more ASIC chips 204 can be configured to compute a specific hash algorithm of a cryptocurrency (e.g., SHA-256 for Bitcoin, Ethash for Ethereum, among others). The plurality of ASIC chips 306 are integrated to perform these computations jointly or in parallel to increase computational power (e.g., hash rate). As shown in FIG. 3, a different fluid level sensor is mounted adjacent to each block. For example, fluid level sensor 308 is mounted on the PCB adjacent to block 302, and fluid level sensor 310 is mounted on the PCB adjacent to block 304.

In some implementations, having a plurality of sensors mounted on a PCB as shown in the FIG. 3 facilitates detection of different levels of the cooling fluid 301. If the detected fluid level is below the position of fluid level sensor 308, a first remedial action (e.g., transmitting a notification of a fluid level to a system operator) is triggered. If the detected fluid level is below the position of fluid level sensor 310 indicating severe depletion in fluid level, a second remedial action (e.g., shutting down electronic device 200 or 300) is triggered.

Figure 4:
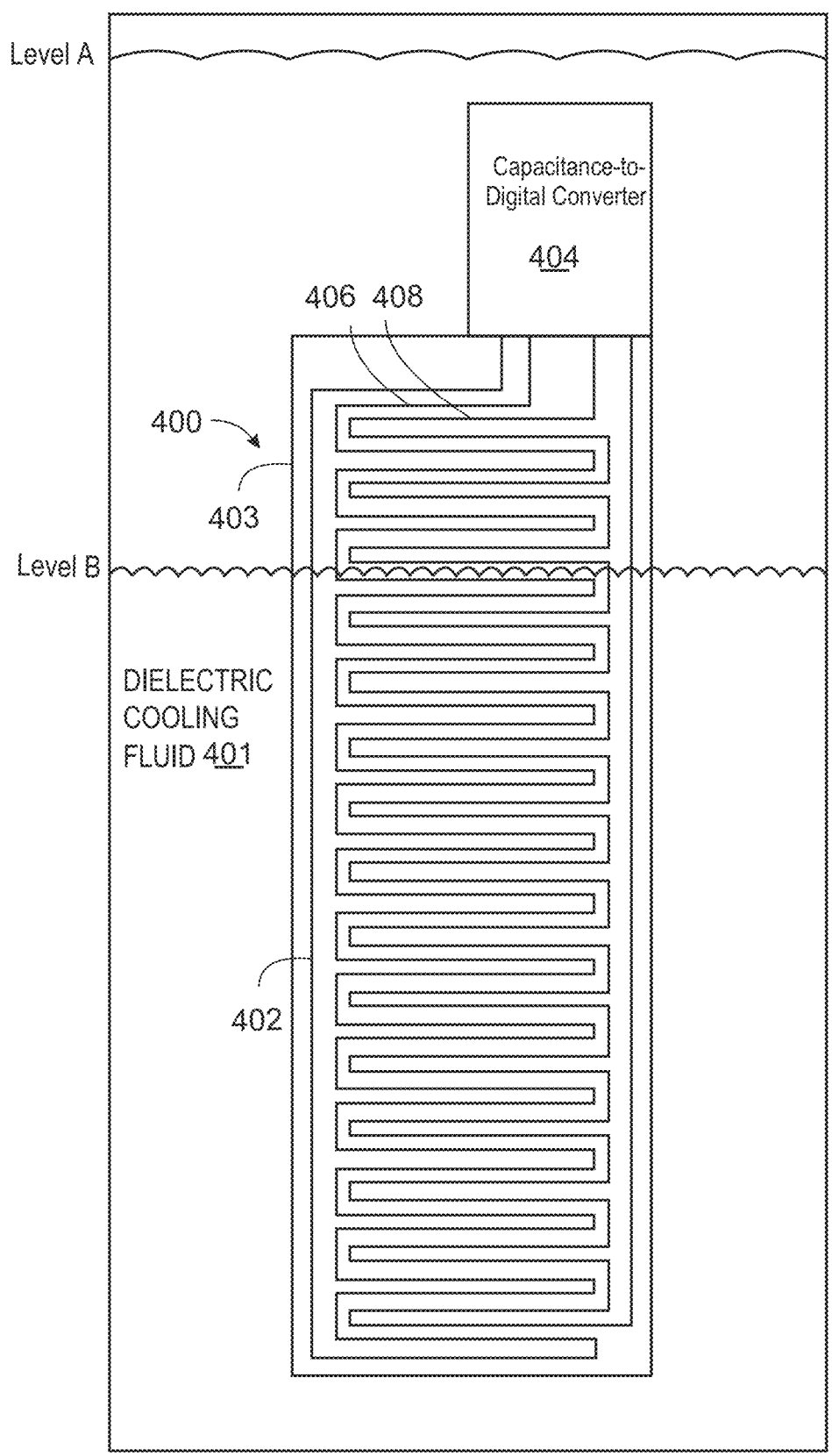
FIG. 4 is a schematic diagram of an example fluid level sensor, according to some implementations.

FIG. 4 is a schematic diagram of an example fluid level sensor, according to some implementations. The fluid level sensor 400 is configured to measure the fluid level of dielectric cooling fluid 401. In some implementations, the fluid level sensor 400 is similar to fluid level sensor 202 mounted on the electronic device 200 PCB, or fluid level sensor 308 or 310 mounted on the electronic device 300 PCB.

As shown, the fluid level sensor 400 includes capacitive sensor 402 and capacitance-to-digital converter 404. The capacitive sensor 402 includes sensing electrode 406 and sensing electrode 408. A capacitance value measured by the capacitive sensor 402 is the capacitance between the sensing electrode 406 and the sensing electrode 408. In some implementations, the fluid level sensor 400 is in physical contact with a dielectric cooling fluid 401 (similar to dielectric cooling fluid 201 or 301) in a tank. If the level of the fluid decreases (e.g., due to evaporation or tank leakage) such that a surface area of fluid level sensor 400 that is in physical contact with the fluid is reduced (the fluid level sensor 400 is not fully submerged in the fluid), the capacitance between the sensing electrode 406 and the sensing electrode 408 decreases. For example, when the dielectric cooling fluid 401 is at level A as shown in FIG. 4, the fluid level sensor 400 is fully submerged in the cooling fluid and has a particular capacitance value corresponding to the amount of the dielectric fluid in contact with the capacitive sensor 402. However, if the dielectric cooling fluid 401 reduces to level B (level B being lower than level A), then a portion 403 of the fluid level sensor 400 that is above level B is no longer in physical contact with the cooling fluid, and the capacitance value of the sensor 402 at level B is lower than the capacitance value at level A due to the amount of dielectric in contact with the capacitive sensor 402 being less at level B. This reduction in capacitance value indicates a lowering of the fluid level in the tank. In this manner, the capacitive sensor 402 can detect a low fluid level. The capacitance to digital converter 404 converts the capacitance value measured by capacitive sensor 402 into a discrete digital value that can be easily interpreted by a microcontroller (e.g., control system 510 of FIG. 5). In some implementations, if the fluid level sensor 400 is fully exposed to the air, a capacitance value measured by the capacitive sensor 402 is a first value, e.g., 6 picofarad (pF). However, if the fluid level sensor 400 is fully immersed in the dielectric cooling fluid 401, a capacitance value measured by the capacitive sensor 402 can change to a second value, e.g., 12 pF.

Figure 5:
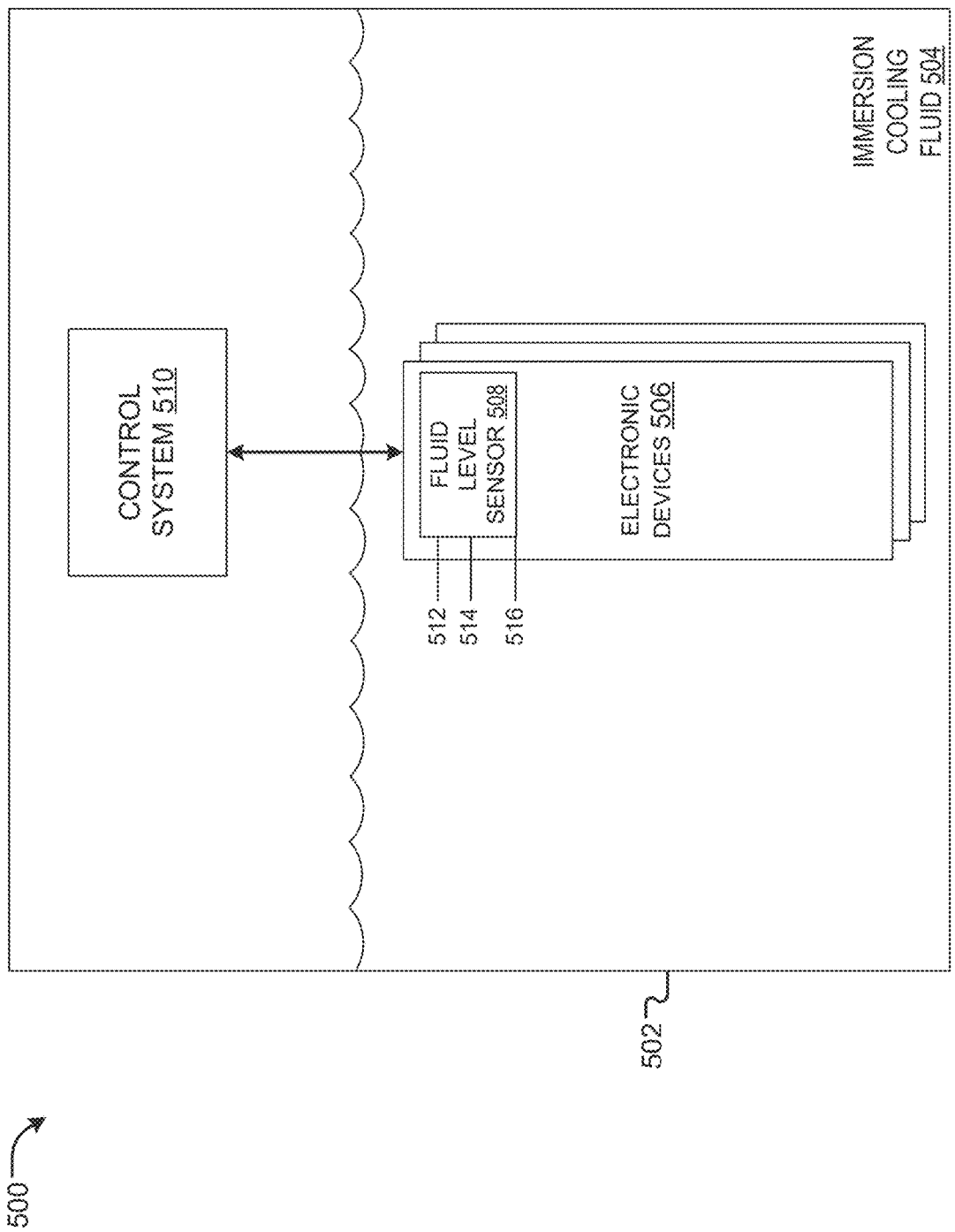
FIG. 5 is a schematic diagram of an example immersion cooling system, according to some implementations.

FIG. 5 is a schematic diagram of an example immersion cooling system 500, according to some implementations. The immersion cooling system 500 may implement one or more aspects of the single-phase immersion cooling system 100 and/or the dual-phase immersion cooling system 101, as shown and described with reference to FIGS. 1A-1B. For example, the immersion cooling system 500 includes tank 502, which may be similar to tank 102A or tank 102B. The immersion cooling system 500 also includes immersion cooling fluid 504, which may be similar to the dielectric cooling fluid 112A (e.g., a single-phase cooling fluid) or the dielectric cooling fluid 112B (e.g., a two-phase cooling fluid).

One or more electronic devices 506 are immersed in the cooling fluid 504. Some or all of the electronic devices 506 are similar to electronic devices 104a, 104b, 200, 300 described above. One or more fluid level sensors 508 are mounted on one or more electronic devices 506. A fluid level sensor 508 is configured to monitor the fluid level of immersion cooling fluid 504 in tank 502. The fluid level sensor 508 is similar to fluid level sensor 202, 308, 310 described above. For example, the fluid level sensor 508 includes a capacitive sensor (e.g., similar to capacitive sensor 402) configured to measure the capacitance of the cooling fluid 504 and a capacitance-to-digital converter (e.g., similar to capacitance-to-digital converter 404) configured to convert the analog capacitance signal detected by the capacitive sensor into a digital signal that can be processed by the control system 510. Although electronic device 506 is shown with a single fluid sensor 508, in some implementations, one or more of electronic devices 506 can have a plurality of fluid sensors 508, e.g., as described with respect to sensors 308 and 310 mounted on the PCB of electronic device 300.

In some implementations, the control system 510 (also referred to as a controller) includes one or more processors and one or more memory devices storing instructions that, when executed, cause the one or more processors of the control system 510 to perform at least one remedial action based on measurements performed by the fluid level sensor 508. The control system 510 may include a microcontroller, a central processing unit, or the like.

In some implementations, the control system 510 is configured to communicate with the electronic devices 506 in the immersion tank 502 via a network connection, Wi-Fi, Bluetooth, or some other communication channel. This allows the control system 510 to notify or alert the electronic devices 506 of a low fluid level, so that the electronic devices 506 can switch to a low power state or shut themselves down before overheating of the electronic devices 506. The control system 510 can also send an alert to a system operator, who can shut down or turn off one or more electronic devices 506, or the whole system including the one or more electronic devices 506. As described previously, the low fluid level can result from a leak or evaporation in the immersion tank 502.

In some implementations, if a capacitance value measured by the capacitive sensor is lower than a first threshold value (e.g., 10 pF) corresponding to a first fluid level threshold 512, the control system 510 performs a first remedial action. For example, the control system 510 transmits a notification of a fluid level (the current fluid level corresponding to the current capacitance value) in the immersion tank 502 to a system operator. The system operator can perform additional remedial actions in response to the notification. For example, the system operator can add more immersion cooling fluid 504 into the immersion tank 502, identify the location of the leak in the immersion tank 502, seal the immersion tank 502 to minimize fluid loss due to evaporation, lower the power of the electronic devices 506, or shut down the electronic devices 506.

In some implementations, if a capacitance value measured by the capacitive sensor is lower than a second threshold value (e.g., 8.5 pF) corresponding to a second fluid level threshold 514 (close to a middle of the fluid level sensor 508), the control system 510 can automatically perform a second remedial action. For example, the control system 510 can transmit a signal that causes at least one of the electronic devices 506 in the cooling fluid 216 in the immersion tank 218 to enter a low power state. It should be noted that the threshold values provided here are for exemplary purposes only; other values are possible in different implementations.

In some implementations, if a capacitance value measured by the capacitive sensor is lower than a third threshold value (e.g., 6 pF) corresponding to a third fluid level threshold 516 (close to a bottom of the fluid level sensor 508), the control system 510 can automatically perform a third remedial action. For example, the control system 510 can transmit a signal that causes at least one of the electronic devices 506 in the immersion tank 218 to shut down.

Figure 6:
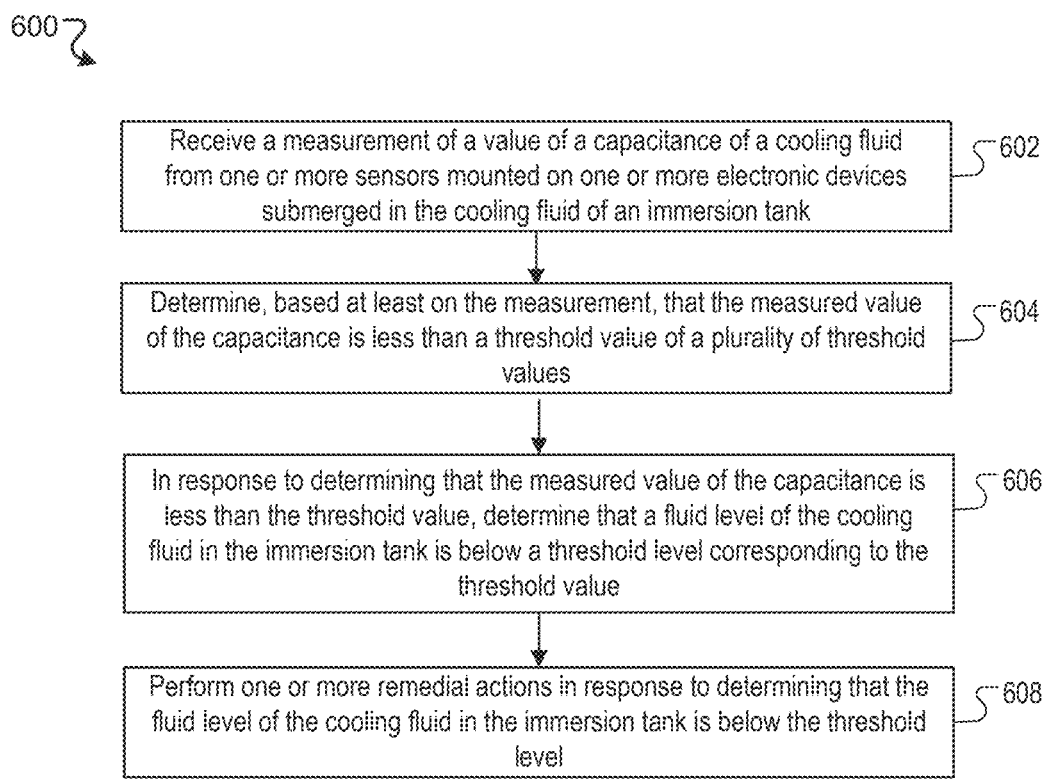
FIG. 6 illustrates a flowchart of an example method for monitoring a fluid level of a cooling fluid in an immersion cooling tank, according to some implementations.

FIG. 6 illustrates a flowchart of an example method for monitoring the fluid level of a cooling fluid in an immersion cooling tank, according to some implementations. For clarity of presentation, the method 600 is generally described in the context of the preceding figures. For example, the method 600 can be performed by the control system 510 of FIG. 5, or any suitable system, environment, software, hardware, or combination thereof. In some implementations, operations of the method 600 can be run in parallel, in combination, in loops, or in any order. The example method 600 can be modified or reconfigured to include additional, fewer, or different steps (not shown in FIG. 6), which can be performed in the order shown or in a different order.

At 602, the control system (e.g., control system 510) receives a measurement of a value of the capacitance of a cooling fluid (e.g., immersion cooling fluid 504) from one or more sensors (e.g., fluid level sensor 508) mounted on one or more electronic devices (e.g., electronic devices 506) submerged in the cooling fluid of an immersion tank (e.g., immersion tank 502).

At 604, the control system determines, based at least on the measurement, that the measured value of the capacitance is less than a threshold value of a plurality of threshold values. The plurality of threshold values includes, e.g., a first threshold value (e.g., 10 pF) corresponding to a first fluid level threshold 512, a second threshold value (e.g., 8.5 pF) corresponding to a second fluid level threshold 514, and a third threshold value (e.g., 6 pF) corresponding to a third fluid level threshold 516.

At 606, in response to determining that the measured value of the capacitance is less than the threshold value, the control system determines that the fluid level of the cooling fluid in the immersion tank is below the threshold level.

At 608, the control system performs one or more remedial actions in response to determining that the fluid level of the cooling fluid in the immersion tank is below the threshold level. The one or more remedial actions include transmitting a notification of a fluid level in the immersion tank to a system operator (in response to the first fluid level threshold), enabling the one or more electronic devices to enter a low power state (in response to the second fluid level threshold), or shutting down the one or more electronic devices (in response to the third fluid level threshold).

After the cooling fluid is filled up to the normal level (e.g., level A in FIG. 4), the one or more electronic devices can continue to perform computations or other work.

Figure 7:
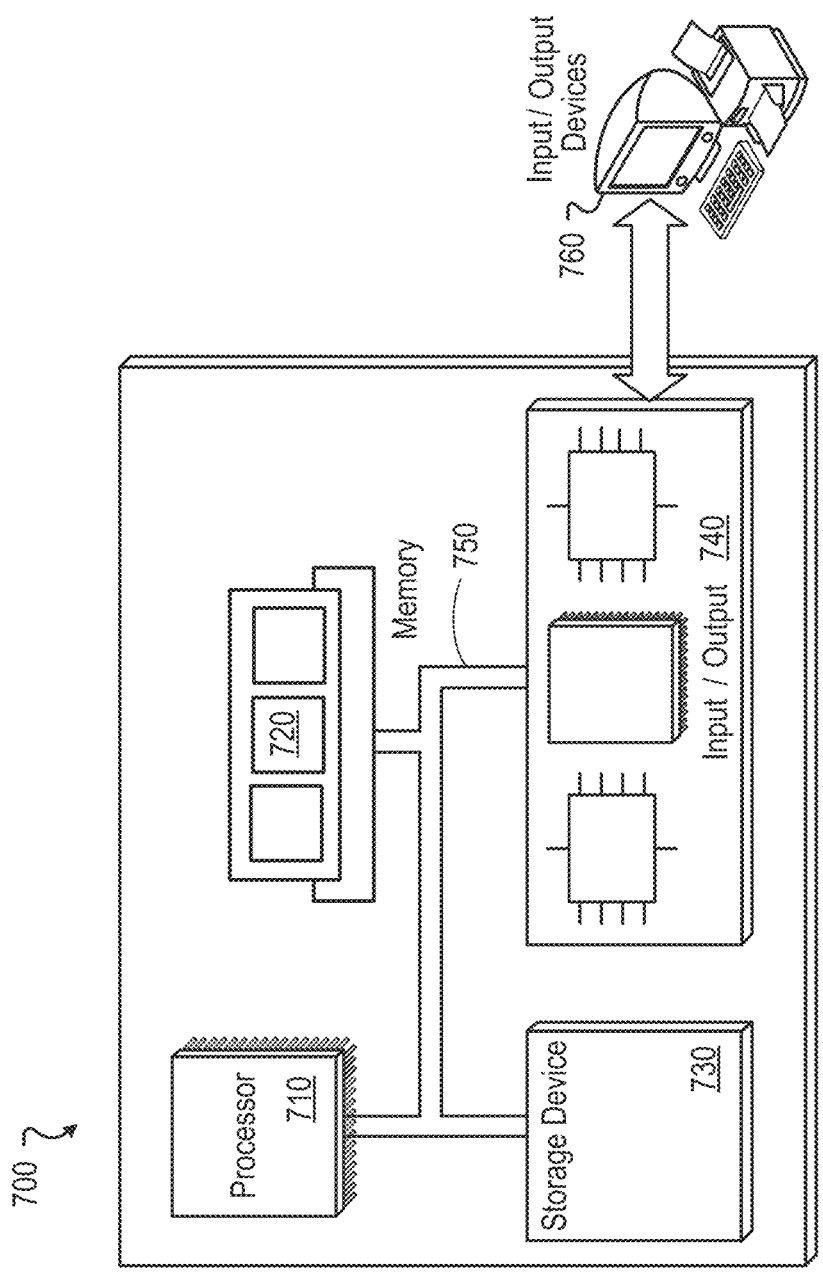
FIG. 7 is a schematic diagram of an example computer system.

FIG. 7 is a schematic diagram of an example computer system. In some implementations, the computer system 700 may include or be a part of one or more of the entities described herein. For example, in some implementations, the computer system 700 is similar to the control system 510 of FIG. 5. As depicted in FIG. 7, the computer system 700 includes a processor 710, a memory 720, a storage device 730, and an input/output device 740. Each of these components can be interconnected, for example, by a system bus 750. The processor 710 is capable of processing instructions for execution within the computer system 700. In some implementations, the processor 710 is a single-threaded processor, a multi-threaded processor, or another type of processor. The processor 710 is capable of processing instructions stored in the memory 720 or on the storage device 730. The memory 720 and the storage device 730 can store information within the computer system 700. For example, the memory 720 and/or the storage device 730 can store measurement data from one or more fluid level sensors as they are received by the control system, as described in the preceding sections. Additionally or alternatively, the memory 720 and/or the storage device 730 can store historical measurement data. Although the computer system 700 is shown as having one processor 710, one memory 720, and one storage device 730 for illustrative purposes, the computer system 700 can include any number of processors 710, memories 720, and storage devices 730 based on system requirements.

The input/output device 740 provides input/output operations for the computer system 700. In some implementations, the input/output device 740 can include one or more of a network interface device (for example, an Ethernet card), a serial communication device (for example, an RS-232 port), or a wireless interface device (for example, an 802.11 card, a 3G wireless modem, a 4G wireless modem, or a 5G wireless modem), or some combination thereof. In some implementations, the input/output device can include driver devices configured to receive input data and send output data to other input/output devices, for example, a keyboard, printer, and/or display devices 760. In some implementations, mobile computing devices, mobile communication devices, and other devices can also be used.

While the present disclosure describes many examples, these should not be construed as limitations on the scope of an invention that is claimed or of what may be claimed, but rather as descriptions of features specific to particular embodiments. Certain features that are described in the context of separate embodiments can also be implemented in combination in a single embodiment. Conversely, various features that are described in the context of a single embodiment can also be implemented in multiple embodiments separately or in any suitable sub-combination. Although some features may be described as acting in certain combinations and even initially claimed as such, one or more features from a claimed combination in some cases can be excised from the combination, and the claimed combination may be directed to a sub-combination or a variation of a sub-combination. Similarly, while some operations may be depicted in the drawings in a particular order, this should not be understood as requiring that such operations are performed in the particular order shown or in sequential order, or that all illustrated operations be performed, to achieve desirable results.

A number of embodiments have been described. Nevertheless, it is understood that various modifications can be made without departing from the spirit and scope of the present disclosure. Accordingly, other embodiments are within the scope of the following claims.

We claim:

1. An apparatus comprising:
an electronic device submerged in a cooling fluid in an immersion tank, wherein the electronic device comprises a printed circuit board (PCB) with a plurality of application-specific integrated circuit (ASIC) chips mounted thereon, and a plurality of sensors mounted on the PCB adjacent to the plurality of ASIC chips, wherein at least one sensor of the plurality of sensors comprises circuitry configured to:
measure a value of a capacitance of the cooling fluid; and
transmit the measured value of the capacitance to a controller device that is communicatively coupled to the at least one sensor; and
the controller device comprising one or more processors and configured to:
receive the measured value of the capacitance from the at least one sensor;
determine that the measured value of the capacitance is less than a threshold value;
in response to determining that the measured value of the capacitance is less than the threshold value, determine that a fluid level of the cooling fluid in the immersion tank is below a threshold level; and
perform at least one remedial action in response to determining that the fluid level of the cooling fluid in the immersion tank is below the threshold level.

2. The apparatus of claim 1, wherein the threshold value is a first threshold value of a plurality of threshold values, and
wherein performing the remedial action comprises transmitting, to a system operator, a notification of the fluid level in the immersion tank.

3. The apparatus of claim 2, wherein the threshold value is a second threshold value of the plurality of threshold values, the second threshold value corresponding to a fluid level in the immersion tank being lower than a fluid level corresponding to the first threshold value, and
wherein performing the remedial action comprises transmitting a first signal that causes the electronic device submerged in the cooling fluid in the immersion tank to enter a low power state.

4. The apparatus of claim 3, wherein the threshold value is a third threshold value of the plurality of threshold values, the third threshold value corresponding to a fluid level in the immersion tank being lower than a fluid level corresponding to the second threshold value, and
wherein performing the remedial action comprises transmitting a second signal that causes the electronic device submerged in the cooling fluid in the immersion tank to shut down.

5. The apparatus of claim 1, wherein the cooling fluid comprises a single-phase immersion cooling liquid or a two-phase immersion cooling liquid.

6. The apparatus of claim 1, wherein the at least one sensor comprises:
a capacitive sensor; and
a capacitance-to-digital converter.

7. The apparatus of claim 1, further comprising:
a heat exchanger configured to dissipate heat generated by the electronic device using the cooling fluid; and
a pump system configured to circulate the cooling fluid through the immersion tank and the heat exchanger.

8. The apparatus of claim 1,
wherein the plurality of ASIC chips are arranged in a plurality of blocks on the PCB, each block comprising a plurality of columns and each column comprising a subset of the plurality of ASIC chips, and
wherein a different sensor of the plurality of sensors is mounted adjacent to each block.

9. The apparatus of claim 1, wherein the electronic device comprises a plurality of PCBs submerged in the cooling fluid in the immersion tank, each PCB comprising:
a plurality of ASIC chips and a plurality of sensors,
wherein the respective plurality of ASIC chips are arranged in a plurality of blocks on the PCB, each block comprising a plurality of columns and each column comprising a subset of the plurality of ASIC chips, and
wherein a different sensor of the respective plurality of sensors is mounted adjacent to each block.

10. A method comprising:
receiving a first measurement of a value of a capacitance of a cooling fluid from a plurality of sensors mounted on one or more electronic devices submerged in the cooling fluid of an immersion tank, wherein each electronic device comprises a printed circuit board (PCB) with a plurality of application-specific integrated circuit (ASIC) chips mounted thereon, and the plurality of sensors mounted on the PCB adjacent to the plurality of ASIC chips;

determining, based at least on the first measurement, that the measured value of the capacitance is less than a first threshold value of a plurality of threshold values;

in response to determining that the measured value of the capacitance is less than the first threshold value, determining that a fluid level of the cooling fluid in the immersion tank is below a first threshold level corresponding to the first threshold value; and transmitting, to a system operator, a notification of the fluid level in the immersion tank in response to determining that the fluid level of the cooling fluid in the immersion tank is below the first threshold level.

11. The method of claim 10, further comprising:

receiving a second measurement of the value of the capacitance of the cooling fluid from the plurality of sensors;

determining, based at least on the second measurement, that the measured value of the capacitance is less than a second threshold value of the plurality of threshold values, wherein the second threshold value corresponds to a second threshold level in the immersion tank being lower than the first threshold level corresponding to the first threshold value; and in response to the determining, transmitting a first signal that causes at least one of the one or more electronic devices submerged in the cooling fluid in the immersion tank to enter a low power state.

12. The method of claim 11, further comprising:

receiving a third measurement of the value of the capacitance of the cooling fluid from the plurality of sensors;

determining, based at least on the third measurement, that the measured value of the capacitance is less than a third threshold value of the plurality of threshold values, wherein the third threshold value corresponds to a third threshold level in the immersion tank being lower than the second threshold level corresponding to the second threshold value; and in response to the determining, transmitting a second signal that causes at least one of the one or more electronic devices submerged in the cooling fluid in the immersion tank to shut down.

13. The method of claim 10, wherein the cooling fluid comprises a single-phase immersion cooling liquid or a two-phase immersion cooling liquid.

14. The method of claim 10, wherein the plurality of ASIC chips are arranged in a plurality of blocks on the PCB, each block comprising a plurality of columns and each column comprising a subset of the plurality of ASIC chips, and wherein a different sensor of the plurality of sensors is mounted adjacent to each block.

15. The method of claim 10, wherein each electronic device comprises a plurality of PCBs submerged in the cooling fluid in the immersion tank, each PCB comprising:

a plurality of ASIC chips and a plurality of sensors, wherein the respective plurality of ASIC chips are arranged in a plurality of blocks on the PCB, each block comprising a plurality of columns and each column comprising a subset of the plurality of ASIC chips, and wherein a different sensor of the respective plurality of sensors is mounted adjacent to each block.

16. One or more non-transitory computer-readable media storing instructions that, when executed, cause one or more processors to perform operations comprising:

receiving a first measurement of a value of a capacitance of a cooling fluid from a plurality of sensors mounted on one or more electronic devices submerged in the cooling fluid of an immersion tank, wherein each electronic device comprises a printed circuit board (PCB) with a plurality of application-specific integrated circuit (ASIC) chips mounted thereon, and the plurality of sensors mounted on the PCB adjacent to the plurality of ASIC chips;

determining, based at least on the first measurement, that the measured value of the capacitance is less than a first threshold value of a plurality of threshold values; and in response to determining that the measured value of the capacitance is less than the first threshold value, determining that a fluid level of the cooling fluid in the immersion tank is below a first threshold level; and transmitting, to a system operator, a notification of the fluid level in the immersion tank in response to determining that the fluid level of the cooling fluid in the immersion tank is below the first threshold level.

17. The non-transitory computer-readable media of claim 16, the operations further comprising:

receiving a second measurement of the value of the capacitance of the cooling fluid from the plurality of sensors;

determining, based at least on the second measurement, that the measured value of the capacitance is less than a second threshold value of the plurality of threshold values, wherein the second threshold value corresponds to a second threshold level in the immersion tank being lower than the first threshold level corresponding to the first threshold value; and in response to the determining, transmitting a first signal that causes at least one of the one or more electronic devices submerged in the cooling fluid in the immersion tank to enter a low power state.

18. The non-transitory computer-readable media of claim 17, the operations further comprising:

receiving a third measurement of the value of the capacitance of the cooling fluid from the plurality of sensors;

determining, based at least on the third measurement, that the measured value of the capacitance is less than a third threshold value of the plurality of threshold values, wherein the third threshold value corresponds to a third threshold level in the immersion tank being lower than the second threshold level corresponding to the second threshold value; and in response to the determining, transmitting a second signal that causes at least one of the one or more electronic devices submerged in the cooling fluid in the immersion tank to shut down.

* * * * *